United States Patent [19]

Morrick

[11] Patent Number: 5,389,252

[45] Date of Patent: Feb. 14, 1995

[54] MAGNETIC FILTER AID

[76] Inventor: Robert A. Morrick, 3209 Pheasant Branch Rd., Middleton, Wis. 53562

[21] Appl. No.: 98,627

[22] Filed: Jul. 28, 1993

[51] Int. Cl.⁶ .............................................. B01D 35/06
[52] U.S. Cl. .................................... 210/223; 184/6.25
[58] Field of Search ................ 210/223, 222; 184/6.25

[56] References Cited

U.S. PATENT DOCUMENTS

| | | | |
|---|---|---|---|
| 4,446,019 | 5/1984 | Robinson | 210/223 |
| 4,450,075 | 5/1984 | Krow | 210/223 |

FOREIGN PATENT DOCUMENTS

| | | | |
|---|---|---|---|
| 1318258 | 6/1987 | U.S.S.R. | 210/223 |
| 1519751 | 11/1989 | U.S.S.R. | 210/223 |
| 1636021 | 3/1991 | U.S.S.R. | 210/223 |

*Primary Examiner*—Matthew O. Savage
*Attorney, Agent, or Firm*—Lee, Mann, Smith, McWilliams, Sweeney & Ohlson

[57] ABSTRACT

A filter aid which magnetically attaches to standard spin-on engine oil filters to provide a means for removing metallic particles from engine oil before the oil passes into the oil filter. The filter aid is compatible with commercially available oil filters and is easily removed, cleaned, and reused, and comprises an annular permanent magnet and an annular particle-collecting disk.

3 Claims, 1 Drawing Sheet

MAGNETIC FILTER AID

BACKGROUND OF THE INVENTION

This invention relates to oil filters which trap and remove magnetic and non-magnetic impurities from engine oil. In particular, it relates to a device capable of improving an oil filter's ability to trap magnetic contaminants.

DESCRIPTION OF THE PRIOR ART

The prior art is generally cognizant of the need to remove magnetic contaminants from engine oil to minimize filter clogging, to extend filter life, and to decrease engine wear.

Magnetic filter devices, incorporating electromagnets or permanent magnets as filters, have been described. In each instance, input oil passes through the magnetic field generated and metallic contaminants are removed. U.S. Pat. Nos. 3,480,145, 4,218,320, and 3,460,679 disclose magnetic assemblies which surround oil filter cartridges and which attract magnetic particles from input oil before the oil passes through the non-magnetic filter. U.S. Pat. Nos. 4,450,075 and 2,936,893 disclose arrangements of permanent magnets within an oil filter.

Existing magnetic oil filters are hampered by several undesirable features. External magnetic filters must match the circumference and surface features of many different commercially available oil filters. Internal magnetic filters are cumbersome to install and require complex precision-tooled fittings. Existing internal and external filters both demand that oil enter the filter before magnetic particles are removed, thereby increasing the likelihood that filters will become clogged as metallic particles accumulate.

SUMMARY OF THE INVENTION

The present invention is directed to an annular magnet and an associated particle-collecting disk formed of easily magnetized material which are magnetically mounted atop an oil filter inlet coverplate. As oil passes from the engine block to the oil filter, metallic particles are attracted by the magnet and particle-collecting disk, and are purged from the oil, before the oil enters the oil filter through the inlet coverplate.

It is an object of the present invention to provide an inexpensive, efficient filter to remove harmful metallic particles from circulating oil.

It is another object of the present invention to provide magnetic filtering capability without unnecessarily impeding oil flow to the non-metallic filter.

It is a further object of the present invention to provide a magnetic filter that is easily removed and reused when the oil filter is changed.

It is a still further object of the present invention to provide a magnetic oil filter compatible with commercially available oil filters without regard to circumference or surface features of the commercial oil filter.

It is a still further object of the present invention to provide a particle-collecting disk of large surface area with which to trap contaminating metallic particles.

Other objects, advantages, and features of the present invention will become apparent from the following specification when taken in conjunction with the accompanying drawings.

DETAILED DESCRIPTION OF THE PREFERRED EMBODIMENT

Figure 1:
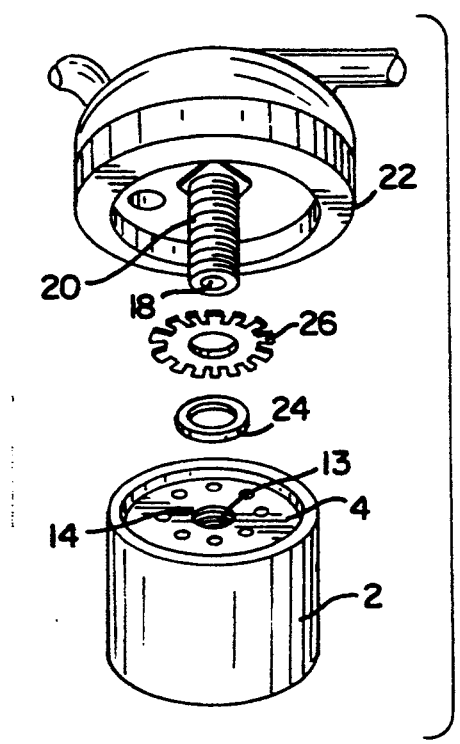
FIG. 1 is an exploded perspective view showing the location of the oil filter, the permanent magnet, and the particle-collecting disk relative to the oil exit pipe of the mounting base of the engine block.
Figure 2:
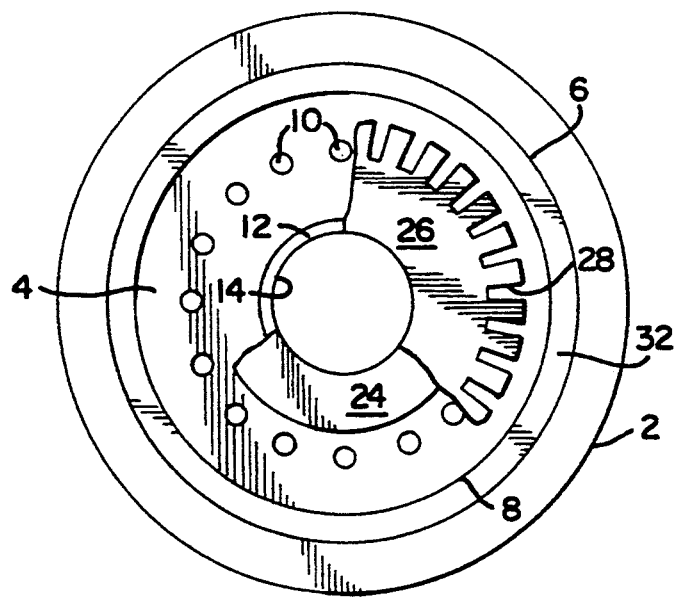
FIG. 2 is a top view, partially cut away to reveal the oil filter inlet coverplate, the permanent magnet, and the particle-collecting disk.
Figure 3:
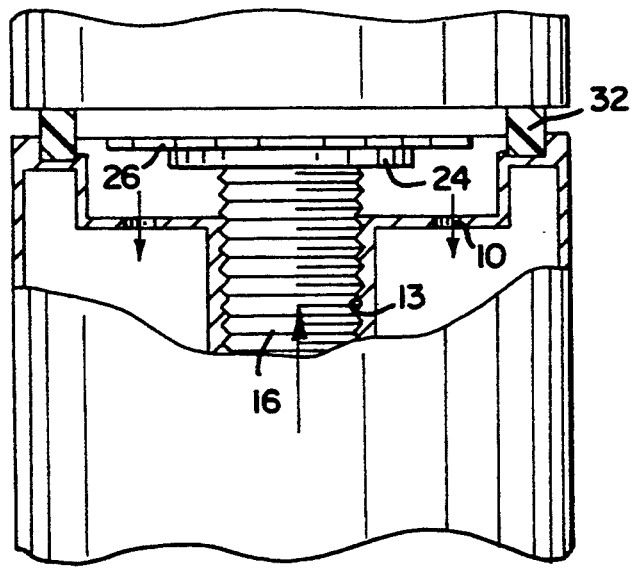
FIG. 3 is a cross-sectional view of a mounted oil filter installed with permanent magnet and particle-collecting disk in accordance with the present invention.

Shown in FIG. 1-3, and generally indicated at 2, is a conventional cylindrical spin-on oil filter that attaches to an engine (not shown). The oil filter 2 has an inlet coverplate 4 forming one end of the cylinder. Inside of the filter, beneath the inlet coverplate 4, is a cylindrical non-magnetic oil filtering material (not shown). Concentric inner and outer gasket-positioning ribs 6, 8 are formed as raised circular ribs on the inlet coverplate 4 of the filter 2. A rubber gasket 32 is mounted between the inner and outer gasket-positioning ribs 6, 8. Radially distributed between the inner gasket positioning rib 6 and a protruding circular ridge 12 on the inlet coverplate 4 are a plurality of oil filter inlet holes 10 through the inlet coverplate 4. There are threads formed in an aperture 14 at the center of the coverplate 4 of the filter 2. The aperture serves as an oil filter outlet 16, a channel through which filtered oil can return to the engine.

Attached to the engine is an oil filter mounting base 22 from which protrudes an oil filter exit pipe 18 with threads 20 for returning filtered oil from the oil filter outlet 16 to the engine. To mount the oil filter 2 on the mounting base 22, the threads 13 of the aperture 14 of the inlet coverplate 4 are threaded onto the threads 20 of the oil filter exit pipe 18 of the mounting base 22.

The filter aid of the present invention includes a permanent annular magnet 24 and an annular particle-collecting disk 26, each of which includes a central hole 30 of sufficient diameter to permit the threaded oil filter exit pipe 18 to pass through and engage the threads 13 in the aperture 14, as noted above. The permanent annular magnet 24 is magnetically secured atop the inlet cover plate 4 with the hole in its center aligned with the aperture 14. The particle-collecting disk 26 is magnetically secured atop the permanent magnet 24 with the hole in its center also aligned with the aperture 14. The annular magnet 24 and particle-collecting disk 26 are held in place both by magnetic attraction to the inlet cover plate 4 and by the oil filter exit pipe 18 on which passes through the magnet 24 and particle-collecting disk 26 during attachment of the oil filter 2 to the mounting base 22.

The permanent magnet 24 may be constructed in a variety of sizes and thicknesses, as may the particle-collecting disk 26, however both must be designed to maintain oil flow to the oil filter 2. The permanent magnet 24 may be made of any permanent magnetic material. The particle-collecting disk 26 can be made of any easily magnetized material, preferably galvanized or stainless steel. In a preferred embodiment, the particle-collecting disk 26 features a repeating arrangement of radial rectangular notches 28 around its perimeter, though the number and shape of the notches may vary depending upon the degree of magnetic-particle contamination in the oil and the rate of oil flow through the oil filter 2. In fact, the shape of the notches may vary as well, and semi-circular and horseshoe-shaped notches work well also. What is required is simply that the notches permit sufficient oil flow and add to the turbulence of the oil flow so that metal particles can be trapped out of the oil as the oil flows passed the disk 26.

Furthermore, the magnetically-connected magnet 24/disk 26 combination must be sufficiently thin to permit the oil filter 2 to mount securely to the mounting base 22 and to permit adequate compression of the rubber gasket 32 by the mounting base 22 to ensure a tight seal between the oil filter 2 and the mounting base 22, preventing oil from leaking while entering or leaving the mounted filter 2.

In operation, a spin-on oil filter 2 receives lubricating oil from an engine's oil reservoir (not shown), filters impurities from the oil, and returns filtered oil to other engine parts. Oil enters the oil filter 2 through the plurality of oil filter inlet holes 10 on the inlet coverplate 4. In keeping with the present invention, however, unfiltered oil must pass the particle-collecting disk 26 and permanent magnet 24 before reaching the oil filter inlet holes 6. Engine-damaging magnetic particles contaminating the engine oil are attracted by the magnetic force of the permanent annular magnet 24. In addition, the magnetized particle-collecting disk 26 creates turbulence in the flow of oil and provides a large magnetic surface on which the contaminating particles may settle. Surprisingly, the attractive force of the annular magnet 24/particle-collecting disk 26 combination is significantly greater than the attractive force of the magnet 24 itself. The effect of this unexpected property is that a greater percentage of contaminating magnetic particles, particularly very small particles, will be trapped above the inlet coverplate 4, thereby dramatically improving the quality of the oil and extending the life of the non-magnetic filter.

The particle-collecting disk 26 provides other useful benefits as well. The notches 28 on the particle-collecting disk 26 increase magnetic surface area over what the area would be on a circular disk and permit increased oil flow to the filter. In addition, the notches 28 create turbulence in the oil flowing to the filter. Such turbulence encourages particulate matter to settle out of the oil fluid and to be trapped by the magnetized particle-collecting disk 26.

The use of the magnetizable disk 26 greatly adds to the magnetic force exerted by the magnet 24. The permanent magnet 24 which is positive on one surface, negative on the other, located between the filter cornerplate 4 and collecting disk 26 dramatically increases the magnetic holding power on the collecting disk 26 in comparison to the magnet 24 alone. Using simple tests of magnetic strength, it is possible to demonstrate that the apparent force of the magnet is increased when the disk 26 is present, and is further increased when the magnet/disk combination is placed on the oil filter, i.e. with metal on both sides of the magnet. This structure increases the level of magnetic force to which the oil is exposed. The filter aid will continue to trap passing particles even if the pressure relief valve internal to the oil filter should open, thus providing a limited form of back-up protection.

When it becomes necessary to replace the oil filter 2, the magnet 24 and particle-collecting disk 26 are easily removed, cleaned and placed atop a new oil filter. These components are durable and may be re-used many times. The magnet 24 and disk 26 are easily cleaned. In fact, most of the particles attracted to the disk 26 simply fall off when the disk is removed from the magnet 24. The rest of the particles can also be easily removed. The disk 26 and magnet 24 are both durable and can be re-used again and again as the oil filter on a car is repeatedly changed. The two elements are of an elegantly simple shape that enables a single size to fit most, although not all, engines with the oil filters commercially available. The disk 26 and magnet 24 are economical to manufacture and simply do not wear out.

The primary function of the filter aid of the invention is to increase the efficiency of any oil filter, not to extend the life of the filter. It is understood that the present invention is not limited to the particular construction and arrangement of parts disclosed and illustrated herein, but embraces all such modified forms thereof as come within the scope of the following claims.

I claim:

1. In a filter system having a housing, a filtering material within the housing, an inlet coverplate containing the filtering material within the housing and sealed to the housing, said coverplate having oil inlet holes, and a central mounting aperture in the coverplate having a predetermined diameter and for mounting the housing on an engine with an exterior side of the coverplate facing the engine, the improvement comprising a filtering aid comprising;

an annular permanent magnet, and an annular particle-collecting disk formed of an easily magnetizable material, said magnet being magnetically secured to said exterior side of said coverplate concentrically with said aperture, and said disk being magnetically secured to said magnet concentrically with said aperture, said magnet and said disk each having a central hole of substantially equal diameter and of a diameter substantially equal to the diameter of said aperture so that said holes and said aperture may be aligned with said plate disposed in the path of oil flow when the housing is mounted on an engine.

2. The improved filter system as set forth in claim 1 wherein the particle-collecting disk is formed to increase its surface area and to increase oil flow to the oil inlet holes.

3. The improved filter system as set forth in claim 2 wherein the particle collection disk includes a regular arrangement of rectangular notches around its perimeter.

* * * * *